US008764390B2

(12) United States Patent
Humhauser

(10) Patent No.: US 8,764,390 B2
(45) Date of Patent: Jul. 1, 2014

(54) ASSEMBLY MECHANISM COMPRISING A TENSION ANCHOR AND CORRESPONDING METHOD FOR A ROTOR SYSTEM OF AN AXIAL TURBO ENGINE

(75) Inventor: Werner Humhauser, Moosburg (DE)

(73) Assignee: MTU Aero Engines GmbH, Munich (DE)

( * ) Notice: Subject to any disclaimer, the term of this patent is extended or adjusted under 35 U.S.C. 154(b) by 561 days.

(21) Appl. No.: 13/130,730

(22) PCT Filed: Dec. 2, 2009

(86) PCT No.: PCT/DE2009/001700

§ 371 (c)(1), (2), (4) Date: May 23, 2011

(87) PCT Pub. No.: WO2010/063272

PCT Pub. Date: Jun. 10, 2010

(65) Prior Publication Data

US 2011/0225822 A1 Sep. 22, 2011

(30) Foreign Application Priority Data

Dec. 4, 2008 (DE) ........................ 10 2008 060 571

(51) Int. Cl.
*B64C 11/04* (2006.01)

(52) U.S. Cl.
USPC .................... 415/190; 415/216.1; 416/196 R; 29/869.21

(58) Field of Classification Search
CPC ........................................................ F01D 5/06
USPC ...... 416/196 R, 198 A, 244 A; 415/189, 190, 415/216.1; 29/889.2, 889.21, 889.3
See application file for complete search history.

(56) References Cited

U.S. PATENT DOCUMENTS 2,458,148 A * 1/1949 Cronstedt ................. 416/201 R
2,458,149 A * 1/1949 Cronstedt ................. 416/201 R
2,461,242 A * 2/1949 Soderberg ................. 416/201 R (Continued)

FOREIGN PATENT DOCUMENTS

| | | | |
|---|---|---|---|
| DE | 102005052819 | A1 | 5/2007 |
| EP | 0342520 | A1 | 11/1989 |
| EP | 1321626 | A1 | 6/2003 |

*Primary Examiner* — David Bryant
*Assistant Examiner* — Jason L Vaughan
(74) *Attorney, Agent, or Firm* — Barlow, Josephs & Holmes, Ltd.

(57) ABSTRACT

The invention relates to a device (1) and to a method associated with an assembly mechanism for a rotor system of an axial turbo engine having a central tension anchor, as is particularly known from engine technology. To this end, the invention provides a tensioning tool that pre-tensions or biases the tension anchor prior to and during the insertion of the anchor into the compound rotor assembly. After inserting the biased tension anchor in the compound rotor assembly, the tension anchor is relaxed, whereby the anchor exercises a compressive force on the compound rotor assembly. According to a preferred embodiment, the compound rotor assembly is also biased (compressed) and relaxed after assembling the tension anchor, so that a desired nominal bias $\text{Sigma}_{nominal}$ can be particularly easily achieved. The use of a shaft locking nut is no longer necessary in the device according to the invention, thus avoiding the difficulties that are associated with the use of this nut, such as complexity and safety problems. The invention also relates to a method for assembling a tension anchor (2) for a rotor system (6) employing the assembly mechanism according to the invention.

11 Claims, 1 Drawing Sheet

(56) References Cited

U.S. PATENT DOCUMENTS

| | | | | |
|---|---|---|---|---|
| 4,118,847 | A * | 10/1978 | Mansson et al. | 29/889.2 |
| 5,537,814 | A | 7/1996 | Nastuk et al. | |
| 6,267,553 | B1 | 7/2001 | Burge | |
| 6,375,421 | B1 * | 4/2002 | Lammas et al. | 415/199.5 |
| 6,428,272 | B1 * | 8/2002 | Pepi et al. | 416/96 R |
| 7,452,188 | B2 * | 11/2008 | Bouchard | 416/204 R |
| 8,100,666 | B2 * | 1/2012 | Makuszewski | 416/244 A |
| 8,152,471 | B2 * | 4/2012 | Pichel | 416/198 A |
| 8,186,939 | B2 * | 5/2012 | Lecuyer et al. | 415/115 |

* cited by examiner

ASSEMBLY MECHANISM COMPRISING A TENSION ANCHOR AND CORRESPONDING METHOD FOR A ROTOR SYSTEM OF AN AXIAL TURBO ENGINE

The invention relates to a device and a method for the assembly of a rotor system of an axial turbo engine with a central tension anchor, as is known particularly from engine technology.

Different devices are known from the prior art for the assembly of several successive rotor disks of an axial turbo engine that are to be combined into a compound assembly (compound rotor disk assembly). Welding techniques may be employed, for example, as long as the connections do not need to be taken apart again. For the more frequent case of a separable connection of the components for reasons of easy maintenance, screw connections, for example, radial clamping bolts, radial toothed couplings, or, however, so-called tension anchors are used, as are disclosed, for example, in the publication U.S. Pat. No. 5,537,814. Also, combinations of central connections (tension anchors) and decentralized connections (screws) are known, for example, from the publication EP 1 321 626 A1. The tension anchor is basically guided through a central bore that passes through all the disks to be joined and has components on both of its ends, by means of which it is joined to the first or the last disk in a form-fitting or force-fitting manner. The joining of the disks that are to be joined then takes place by means of a compressive stress, which the tension anchor exercises on both sides of the compound assembly. Such tension anchors have a number of advantages. A radial drilling through the disk and the notches associated therewith are dispensed with, as is also the presence of welded joints with the usually necessary post-machining; in addition, the possibility of an easy dismantling is indicated.

As is also disclosed, for example, in U.S. Pat. No. 5,537,814 or DE 10 2005 052 819 A1, when it is installed, the tension anchor must be subjected to a specific pre-tensioning or biasing, which is then introduced in the compound rotor disk assembly as compressive stress. This compressive stress is usually produced in such a way that the tension anchor is connected to one end of the compound assembly in a form-fitting or force-fitting manner, for example, it is screwed to it and has a shaft locking nut on its other end. By tightening this shaft locking nut, the tension anchor is placed under tension and thus braces the disks to be assembled into the compound assembly.

This procedure, however, has a number of disadvantages, in particular, with respect to the particulars in the field of engine technology. Thus, in engines of this type, the tension anchors are very highly loaded mechanically, and with them, the shaft locking nut connections, since, in addition to the high stresses that act on them, non-stationary loads also occur, so that the components must have a correspondingly high resistance to periodic stress or high fatigue strength. Also, temperature fluctuations occur in engines, and as a consequence, a corresponding thermal stress occurs. The loads, which result from vibrations associated with high temperatures or temperature changes when the engine is turned off and then turned on again or when there are changes in the load, first lead to a fluctuating biasing of the tension anchor, for example, by components that are heated to a varying extent and correspondingly are placed under tension very differently. In the extreme case, the biasing can fall below a minimum necessary value, so that the rotor disks separate from the compound assembly, or the biasing can increase to above a maximum value, so that the tension anchor cracks. The publication DE 10 2005 052 819 A1 treats this problem, whereby, however, a conventional shaft locking nut also finds use here for biasing the tension anchor that is formed of multiple parts.

It is precisely in the region of the shaft locking nut, however, that particular wear phenomena occur, such as the increased sensitivity to cracking due to notch effects at the thread root, and so-called "fretting", whereby corrosion is added to the mechanical wear and tear, which in turn increases the mechanical wear. The stress acts even more intensely on additional shaft locking nuts that may be present, which, in the assembly of multi-stage and thus longer engines, are disposed not only at the end, but also in the central region of the tension anchor. In addition, these types of shaft locking nuts and the threads associated therewith, which are found correspondingly in or at the disks (rotors) to be joined, increase the complexity, the weight, the required structural space, the number of parts, and thus the costs, and simultaneously represent a problem due to the tendency toward cracking.

The problem of the invention is accordingly to provide a device and a method that overcome the disadvantages of the prior art. In particular, the disadvantages of high wear phenomena, a large number of parts and corresponding costs will be avoided.

The problem will be solved by the features of the device according to the invention according to claim 1, as well as the features of the method according to the invention according to claim 10. Correspondingly, according to the invention, the use of a shaft locking nut, as is usually necessary for the assembly and, in particular, for the operation of an assembled compound assembly of rotor disks according to the invention, can be dispensed with, if the assembly mechanism according to the invention and described in the following is employed.

Additional preferred embodiments can be derived from the dependent claims as well as from the following detailed description and the figure.

The device according to the invention is an assembly mechanism for a compound assembly made up of several disks, one following the other, as used particularly for a rotor system of an axial turbo engine, with the use of a tension anchor. This tension anchor has a front end and a back end, each with a component for introducing force. In the case of an engine, the front end points in the intake direction and the back end points in the ejection direction. The compound disk assembly to be produced can preferably be a rotor system having a compound rotor disk assembly made of at least two successive disks (rotors). In the assembled state, these must be placed under tension such that a nominal bias $\text{Sigma}_{nominal}$ is introduced on the compound assembly by the tension anchor. This nominal bias presses the compound assembly together, so that a change in the position of the rotors relative to one another is no longer possible during operation.

According to the invention, a tensioning tool comprising at least the following components is now provided for assembling the compound disk assembly:

- a push rod having a front end and a back end that is disposed coaxially inside the hollow tension anchor; with
- a pressure device for introducing a compressive force onto one end of the push rod.

The push rod can thus be combined with the pressure device on the front end or on the back end of the tension anchor in such a way that when a compressive force is produced with the pressure device, the tension anchor is placed under tension with the introduction of an assembly bias $\text{Sigma}_{assembly}$. Accordingly, the push rod together with the pressure device serve for the purpose of placing the tension anchor under tension, so that a specific tensile stress is established in its cross section. The push rod is preferably configured in such a way that it essentially extends over the entire length of the tension anchor. The pressure device need only make up a small part of this length, since the increase in length that the pressure device takes up by its extension on the tension anchor is limited and, for example, amounts to only a few millimeters. The push rod thus serves for lengthening the pressure device.

Most preferably, the push rod is configured in such a way that it is exchangeable, so that push rods of different lengths and/or having different diameters, etc. can be used in each case according to the concrete assembly task.

According to the invention, the tension anchor must have components for introducing force on both ends, so that the tensile forces acting axially in it on the disks to be biased can be introduced or changed in direction.

According to a preferred embodiment, it is provided that the tension anchor has a thread on one end as a component for changing the force direction for screwing into the disk of the rotor system disposed correspondingly at this end. Accordingly, this thread is preferably an outer thread according to the invention. Particularly preferred, the tension anchor has this tension anchor thread as a force introduction component on this end exclusively. It is further provided that the pressure device is disposed on the other end of the tension anchor. In other words, it is irrelevant in principle whether the tension anchor thread is found on the front end of the tension anchor and the pressure device is found on the back end or vice versa. It is preferred, however, that the two components are disposed at different ends of the tension anchor. Preferably, as a force introduction component, at its other end, the tension anchor has a radial shoulder for the form-fitting connection to the disk of the rotor system disposed at this end, this disk preferably having a corresponding counter-surface on the front side. Particularly preferred, the tension anchor has this radial shoulder as a force introduction component at this end exclusively. A conventional shaft locking nut is accordingly not necessary. In this way, by dispensing with the conventional shaft locking nut, the disadvantages described above can be avoided. The radial shoulder is created and disposed in such a way that when the assembly bias $\text{Sigma}_{assembly}$ introduced by means of the push rod and the pressure device is unloaded, the tension anchor contracts, but only far enough for the radial shoulder to come into contact with the counter-surface that is preferably present and that is found on the disk disposed at the corresponding end of the tension anchor. Subsequently, the tensile force residing in the tension anchor exercises a compressive force of the same magnitude on the corresponding counter-surface, so that the compound disk assembly is compressed. As long as the tension anchor also can relax only slightly, the force that is established in this way is smaller than the assembly bias $\text{Sigma}_{assembly}$ and preferably corresponds exactly to the nominal bias $\text{Sigma}_{nominal}$. The force flow in this case, in the assembled state, runs as a tensile force through the tension anchor, at one of its ends it passes via the tension anchor thread into the compound rotor assembly, then as a compressive force through this compound rotor assembly, and finally is guided back at the other end of the compound rotor assembly by means of the counter-surface of the last disk to the radial shoulder of the corresponding end of the tension anchor into the tension anchor. A tightening of a shaft locking nut is no longer necessary, as long as it is assured by the dimensioning of the components and the correct magnitude of the assembly bias $\text{Sigma}_{assembly}$ that the desired nominal bias $\text{Sigma}_{nominal}$ is also established. This dimensioning is possible, however, without problem to any experienced person skilled in the art and thus does not need to be discussed further here.

It is preferably further provided that the assembly system according to the invention also comprises a connection piece for the detachable joining of the pressure device in a form-fitting and/or force-fitting manner to the other end of the tension anchor. This connection piece is disposed at the end of the pressure device pointing away from the tension anchor.

Also, the connection piece preferably has a pressure surface that is in contact with the pressure device, and a fastening region that can be joined to the tension anchor. It is particularly preferred that this fastening region is configured as a screw thread, whereby the tension anchor has an outer thread, and the connection piece has an inner thread. In the case of the indicated deflection of the pressure device, this connection piece can now be screwed onto the tension anchor or unscrewed from the tension anchor by means of axially rotating it, so that in this way, a fine adjustment of the position is made possible. Further, by employing the connection piece, it is possible to very simply assemble and disassemble the assembly mechanism made up of the push rod, pressure device, and connection piece.

According to a preferred embodiment, the pressure device according to the invention is configured as a hydraulic cylinder. Devices of this type can produce the necessary forces that are required for the pre-tensioning or biasing of the tension anchor according to the invention in the smallest structural space. Of course, the pressure device can be configured alternatively as a device that operates pneumatically, mechanically, or electrically.

It is also preferred that the push rod according to the invention is formed as a hollow body. In this way, the weight of the same can be kept small enough that the assembly of the push rod can be accomplished by one or two persons without special auxiliary means. Of course, it is assured in this way that the stability which is necessary for use remains assured. Therefore, push rods having a cross section that is as large as possible, but with walls that are as thin as possible, are preferred, since these rods have a smaller cross-sectional surface with the same geometrical moment of inertia.

According to another embodiment, it is provided that the tension anchor comprises one or more radial support surfaces at its outer wall for supporting the components surrounding the tension anchor on this anchor. This may be of advantage, in particular, in the case of very long tension anchors. While too large a number of radial support surfaces may lead to high friction during assembly, too small a number of these support surfaces may cause the tension anchor to run with operating rpm in an rpm range that is dynamically super-critical for the rotor.

According to a particularly preferred embodiment, the assembly mechanism according to the invention further comprises components for pre-compressing the rotor system to the nominal bias $\text{Sigma}_{nominal}$. These components may be driven, for example, hydraulically, pneumatically, mechanically or electrically and serve for the purpose of placing the compound rotor disk assembly that is at first loosely assembled under an axially acting compressive stress, so that this compound rotor disk assembly is compressed and is simultaneously held by means of the friction forces arising at the contact surfaces of the disks. The components are configured in such a way that they do not hinder the insertion and use of the tension anchor, the push rod, and the pressure device in the way according to the invention, and in turn, are not hindered by the other components of the device according to the invention. The pre-compressing components must also be able to introduce at least the nominal bias $\text{Sigma}_{nominal}$ necessary for reliable assembly onto the compound disk assembly.

It is provided according to the invention that the components for pre-compressing first compress the compound rotor disk assembly, and then the tension anchor that is biased by the push rod and pressure device is introduced into this compound disk assembly. After the tension anchor has been screwed in, both this anchor as well as also the biased or pre-compressed compound rotor disk are relaxed. As soon as the tension anchor and the compound rotor disk assembly have each been biased or pre-compressed to nominal bias $\text{Sigma}_{nominal}$, this tension remains in the system, so that a bias corresponding to the specifications is assured.

The invention also discloses a method for the assembly of a tension anchor for a rotor system with an assembly mechanism according to claim 1*. This method is divided into the following steps:

First, the push rod is inserted together with the pressure device into the tension anchor, thus introduced axially and centrally into the tension anchor configured as a hollow shaft.

*sic; claim 10?—Translator's note.

After this, one end, for example, the front end of the push rod is joined to the corresponding end of the tension anchor. This is carried out each time either in a force-fitting and/or form-fitting manner, depending on the embodiment, whereby a pure form-fitting connection is preferred. For this purpose, the tension anchor may have, for example, a radial, inner-lying shoulder on which one end of the push rod stops. The tension anchor is now joined on one side with the push rod and is thus in a position to at least take up compressive forces.

If it has not already been carried out in advance, now the other end, for example, the back end of the push rod is connected to the pressure device in a force-fitting and/or form-fitting manner. This step is omitted if the push rod and pressure device can be viewed as one structural unit or they are not separated. In principle, in this case, the provision of corresponding adequately dimensioned front-side contact surfaces on both components is sufficient, since only the push rod and the pressure device are pressure-loaded. For reasons of operating safety, however, it may be desirable to screw the components together, for example.

Subsequently, a force-fitting and/or form-fitting joining of the pressure device is made to the other end of the tension anchor. It must be assured that the compressive forces that are to be introduced on both ends by the pressure device and the push rod also are not abolished. For this purpose, in a particularly advantageous manner, an adjustable connection piece of the above-described type finds use. Now, the flow of force between the inner-lying push rod with the pressure device and the outer-lying tension anchor is closed.

Then a compressive force is introduced onto the push rod by means of the pressure device, so that the tension anchor is placed under tension to an assembly bias $\text{Sigma}_{assembly}$, whereby $\text{Sigma}_{assembly}$ is larger than or equal to the nominal bias $\text{Sigma}_{nominal}$.

In the next step, the assembly mechanism made up of the push rod with the pressure device and the tension anchor in the tensioned, biased state is introduced into the rotor system. The rotor system must be at least loosely assembled for this purpose; preferably, it is appropriately secured, so that any unintentional relative displacements of the components of the rotor system cannot occur during the introduction of the assembly mechanism.

Next, one end, for example, the front end of the biased tension anchor is connected to the disk of the rotor system that is disposed at this one end in a force-fitting and/or form-fitting manner, which is most preferably carried out by screwing it in. In this case, it is screwed in only far enough that the other end, for example, the back end of the tension anchor is form-fitted to the disk assembly of the rotor system that is disposed at this other end. This form fit must now only be suitable for taking up compressive forces, which later lead to a compression of the compound rotor disk assembly by means of the tension anchor. Correspondingly, a simple radial shoulder is sufficient here, which interacts with a corresponding counter-surface that is found on the front side on the disk of the rotor system disposed at this end.

After this, the assembly bias $\text{Sigma}_{assembly}$ is brought to zero by relaxing the pressure device, so that the tension anchor in turn is now relaxed by exercising a compressive force on the rotor system. Most preferably, this is done until the remaining bias amounts exactly to $\text{Sigma}_{nominal}$. The actual bias is adjusted by an equilibrium between a possible bias (compression, for this purpose immediately) of the rotor system and the assembly bias of the tension anchor.

In a last step, finally, the relaxed push rod with the pressure device is removed from the tension anchor. Since the pressure device and, as the case may be, the connection piece no longer exercise pressure on the tension anchor, here, only the connection at the end of the tension anchor lying opposite the pressure device needs to be loosened, for example, by means of unscrewing the corresponding thread, and the push rod will be removed from the hollow tension anchor.

It is clear that the steps described here can also be conducted in part in a modified sequence and in this case, the essence of the invention is maintained in spite of this.

If need be, the steps can be repeated for the case when the obtained nominal bias is too small or too large, whereby appropriate spacers need to be introduced at a suitable place or removed therefrom.

According to another preferred embodiment, the compound rotor disk assembly is biased or compressed by means of components that are appropriate for pre-compressing prior to the first step described above. In a particularly preferred manner, this compression is carried out exactly to the nominal bias $\text{Sigma}_{nominal}$. For conducting this step, refer to the aforementioned discussion relative to the components for pre-compressing. Also according to this embodiment, after the last step, the pre-compressing is removed by means of relaxing the rotor system, and the components for pre-compressing are also removed.

In this case, it is also particularly preferred that the assembly bias $\text{Sigma}_{assembly}$ of the tension anchor is exactly equal to the nominal bias $\text{Sigma}_{nominal}$. In this way, it is assured that with the common relaxing of the biased (extended) tension anchor and the biased (compressed) rotor system, a force equilibrium is produced, in which the desired nominal bias $\text{Sigma}_{nominal}$ is precisely established. For the purpose here, when the biased tension anchor is introduced into the rotor system, it must be assured that the tension anchor is screwed in "hand tight", for example, up to a radial shoulder (stop collar), so that a relaxation of the tension anchor leads directly to exercising a compressive force on the rotor system without first relaxing the tension anchor to "naught".

The complexity of the construction is reduced by the use of the assembly mechanism according to the invention and the associated omission of the use of shaft locking nuts for biasing a tension anchor. Due to the smaller number of parts, the weight and the required structural space also decrease, which in turn positively affects costs. Safety problems due to notching at the corresponding threads to be provided for a shaft locking nut are also decreased.

Figure 1:
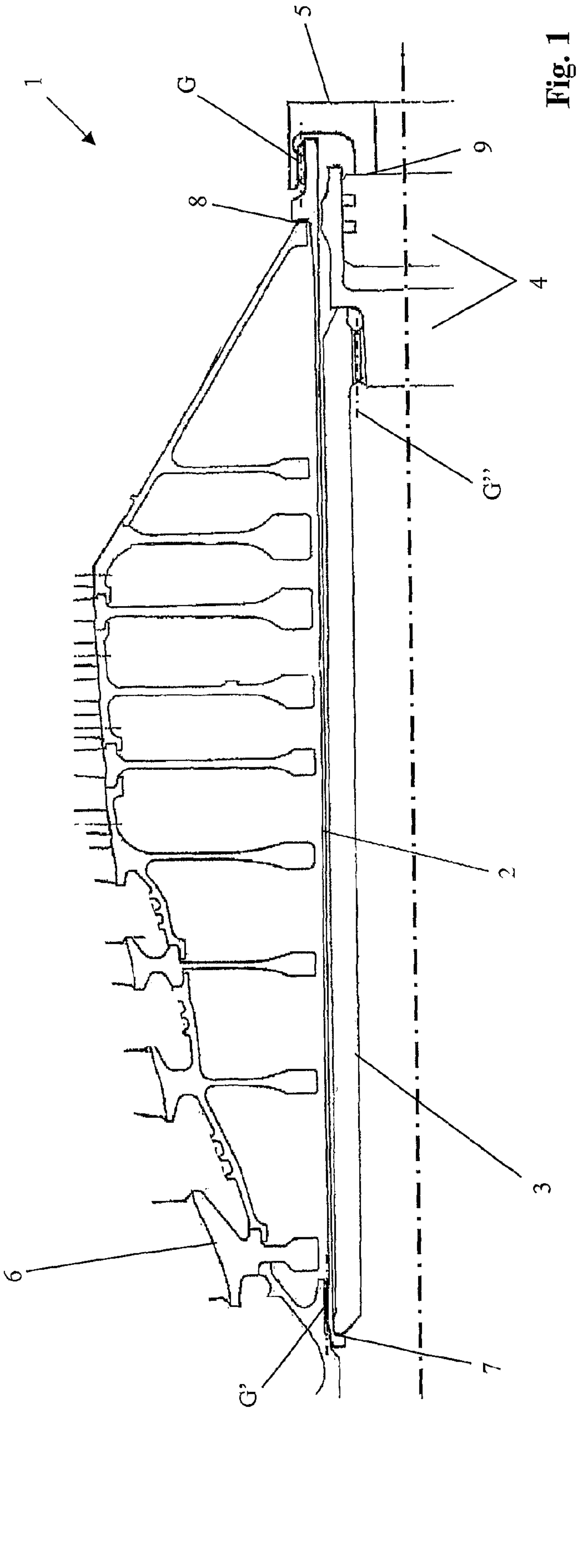
FIG. 1 shows a schematic lengthwise half section through a part of an axial turbo engine, shown in a very simplified manner, having the assembly mechanism according to the invention.

Refer to FIG. 1 for the illustration of the invention; this figure shows a schematic lengthwise half section through a part of an axial turbo engine, shown in a very simplified manner, in particular a compound rotor disk assembly, as well as a tension anchor for biasing this compound disk assembly. The axis of rotation is symbolized by the dot-dash line.

Shown is an assembly mechanism 1, which is formed by the components: a tension anchor 2, which is formed as a hollow shaft, as well as a push bar 3 and a pressure device 4, as well as a connection piece 5.

Tension anchor 2 has a radial shoulder 7 on one of its ends, shown at the left in the figure. This shoulder is in a position to take up compressive forces that are exercised on tension anchor 2 by push rod 3. On its other end, shown at the right in the figure, tension anchor 2 has a thread connection G, which engages with connection piece 5. Further, tension anchor 2 comprises another radial shoulder 8, which is configured and disposed in such a way that it bumps up against or stops at a corresponding counter-surface of rotor system 6 that is shown in a schematic and very simplified manner.

Rotor system 6 has on its end, which is disposed opposite to this counter-surface, an inner thread that provides a threaded connection G' together with a corresponding outer thread of the tension anchor. Tension anchor 2 can be screwed into rotor system 6 at this site and, in fact, screwed in until radial shoulder 8 (the stop) bumps up against rotor system 6.

Pressure device 4 is connected to the end of push rod 3 at the opposite end from radial shoulder 7. The pressure device serves for generating a compressive force, which is required for biasing tension anchor 2; push rod 3 only serves for lengthening pressure device 4. In the embodiment shown, pressure device 4 is configured as a hydraulic cylinder. On one of its sides (at the left in the figure), it has a threaded connection G" with push rod 3, so that these two components can be treated as one structural unit. On its other end (at the right in the figure), pressure device 4 has a pressure surface 9, which serves for transferring the compressive force onto connection piece 5.

Connection piece 5 finally serves for introducing the compressive force of pressure device 4 into tension anchor 2, in which it produces a lengthwise extension. For this purpose, connection piece 5 must be able to be appropriately connected, which is made possible in the embodiment shown by means of the aforementioned thread G.

For assembling the assembly mechanism 1, tension anchor 2 is first pre-extended by means of push rod 3 with pressure device 4, joined to it in a force-fitting and/or form-fitting manner, whereby it is placed under tension.

Subsequently, the tension anchor 2 biased in this way is introduced into rotor system 6, which is in turn, most preferably, pre-compressed (not shown). Tension anchor 2 is attached by thread connection G' in rotor system 6 on one side, and in fact, by means of screwing it in up to the point at which radial shoulder 8 is stopped on rotor system 6.

Finally, tension anchor 2 is relaxed by canceling the compressive stress introduced by pressure device 4, whereby the anchor attempts to contract. As long as tension anchor 2 already has a form-fitting contact with rotor system 6, however, this contraction is prevented by rotor system 6. The tensile stress existing in tension anchor 2 serves now for the purpose of compressing (bracing) rotor system 6.

According to this embodiment, the assembly bias $\text{Sigma}_{assembly}$ that has been introduced during assembly is reduced by relaxing by a specific value, so that to obtain a desired nominal bias $\text{Sigma}_{nominal}$, the value for $\text{Sigma}_{assembly}$ must be selected correspondingly higher.

According to an embodiment, which is not shown, rotor system 6 is also biased (compressed) by means of components for pre-compressing, which are also not shown, and, in fact, preferably is biased exactly to the value of $\text{Sigma}_{nominal}$ at which tension anchor 2 is also biased. When the biased tension anchor 2 is relaxed after it has been inserted and screwed in, the desired nominal bias $\text{Sigma}_{nominal}$ is then exactly established.

Figure 2:
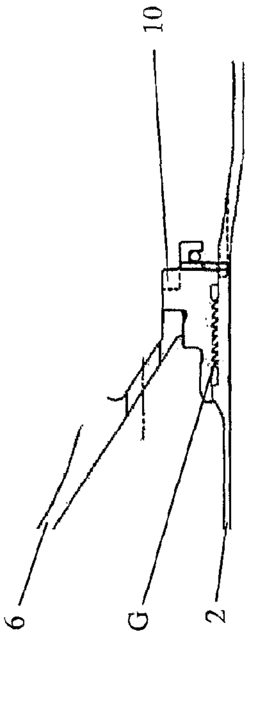
FIG. 2 shows the detail of an alternative fastening in the form of a shaft locking nut 10.

FIG. 2 shows the detail of an alternative fastening in the form of a shaft locking nut 10. Shaft locking nut 10 has an inner thread, which produces a threaded connection G with tension anchor 2. By tightening shaft locking nut 10, the tension anchor, which is attached in a form-fitting and/or force-fitting manner at its other end (not shown) to the corresponding end of the compound rotor assembly, is placed under tension in its lengthwise direction, so that the compressive stress, with which the compound assembly is compressed, is correspondingly increased.

The invention claimed is:

1. An assembly mechanism (1) for a rotor system of an axial turbo engine that includes a central axis of rotation, whereby at least one tension anchor (2) is provided with a front end and a back end, each end of the tension anchor having a force introduction component, and whereby the rotor system (6) comprises a compound rotor disk assembly including at least two rotor disks, the rotor disks having a nominal bias in an assembled state, the nominal bias being provided by the tension anchor (2) when the tension anchor is not placed under tension, whereby the assembly mechanism includes a tensioning tool comprising the following components:

- a push rod (3) having a front end and a back end, wherein the front end and back end are disposed coaxially inside the tension anchor (2) relative to the central axis of rotation of the turbo engine;
- a pressure device (4) for introducing a compressive force onto either the back end or the front end of the push rod (3); wherein the push rod (3) is connected to the pressure device (4) at a location proximal to either the front end or on the back end of tension anchor (2) in such a way that when a compressive force is generated by the pressure device (4), and applied to the push rod, the tension anchor (2) is placed under tension, wherein when the tension anchor is placed under tension the tension anchor provides an assembly bias for installation of the tension anchor to the compound rotor disk assembly and wherein the pressure device is configured to extend the length of the tension anchor.

2. The assembly mechanism (1) according to claim 1, further providing the tension anchor (2) having a tension anchor thread (G') on either the front end or back end of the tension anchor, the tension anchor thread providing a force introduction component, wherein the tension anchor thread provides a means for threading the tension anchor into at least one of the rotor disk of the rotor system (6), wherein the tension anchor thread is disposed at the end of the tension anchor that is distal from the pressure device (4).

3. The assembly mechanism (1) according to claim 1, further providing that the tension anchor (2) includes a radial shoulder (8) that is located on the end of the tension anchor that is distal from the tension anchor thread, wherein the radial shoulder provides a force introduction component for fitting the tension anchor onto a portion of the rotor system (6).

4. The assembly mechanism (1) according to claim 1, further comprising a connection piece (5) for the detachable connection of the pressure device (4) to either end of tension anchor (2).

5. The assembly mechanism (1) according to claim 4, wherein the connection piece (5) includes a pressure surface (9) for taking up the compressive force of the pressure device (4), and the connection piece includes a thread (G) for threading the connection piece onto either end of tension anchor (2).

6. The assembly mechanism (1) according to claim 1, wherein pressure device (4) is a hydraulic cylinder.

7. The assembly mechanism (1) according to claim 1, wherein the push rod (3) is hollow.

8. The assembly mechanism (1) according to claim 1, wherein the tension anchor includes an outer wall that provides one or more radial support surfaces.

9. The assembly mechanism (1) according to claim 1, further comprising components for compressing the rotor system (6) to the nominal bias.

10. A method for the assembly of a tension anchor (2) for a rotor system (6) using the assembly mechanism (1) of claim 1, the method comprising the following steps:

introducing the push rod (3) with the pressure device (4) into the tension anchor (2);

connecting one end of the push rod (3) to one end of tension anchor (2);

connecting the end of push rod (3) that is not connected to the tension anchor to the pressure device (4);

connecting the pressure device (4) to the end of tension anchor (2) that is not connected to the push rod;

introducing a compressive force by means of the pressure device (4) onto the push rod (3), such that the tension anchor (2) is placed under tension;

introducing the assembly mechanism (1) including the push rod (3), the pressure device (4) and the tension anchor (2) under tension into the rotor system (6);

connecting one end of tension anchor (2) to one of the rotor disks of the rotor system (6);

removing the compressive force by means of the pressure device (4), such that the tension anchor (2) provides a compressive force on the rotor system (6);

disconnecting the push rod (3) and the pressure device (4) from the tension anchor (2).

11. The method according to claim 10, wherein the compound rotor disk assembly is biased or compressed by means of components for compressing the compound rotor disk assembly to the nominal bias, and after the push rod and the pressure device have been disconnected from the tension anchor the compressing of the compound rotor disk assembly is removed and the components for the compressing of the compound rotor disk assembly are removed.

* * * * *